United States Patent
Zagorski et al.

(10) Patent No.: US 8,255,121 B2
(45) Date of Patent: Aug. 28, 2012

(54) AUTONOMOUS CONTROL FOR VEHICLE PEDAL MIS-APPLY SITUATIONS

(75) Inventors: Chad T. Zagorski, Clarkston, MI (US); Daniel B. Cutler, Novi, MI (US); Aamrapali Chatterjee, Okemos, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 563 days.

(21) Appl. No.: 12/498,929

(22) Filed: Jul. 7, 2009

(65) Prior Publication Data

US 2011/0010034 A1 Jan. 13, 2011

(51) Int. Cl.
 *G06F 7/00* (2006.01)
 *G06F 17/00* (2006.01)
(52) U.S. Cl. ............... 701/45; 701/70; 701/301
(58) Field of Classification Search .......... None
See application file for complete search history.

(56) References Cited

U.S. PATENT DOCUMENTS

| | | | | |
|---|---|---|---|---|
| 5,193,640 | A | * | 3/1993 | Lee ............... 180/271 |
| 5,797,467 | A | * | 8/1998 | Watanabe ............ 180/271 |
| 6,084,508 | A | | 7/2000 | Mai et al. |
| 6,226,593 | B1 | | 5/2001 | Kurz et al. |
| 6,517,172 | B1 | | 2/2003 | Bond, III et al. |
| 7,035,735 | B2 | | 4/2006 | Knoop et al. |
| 7,280,902 | B2 | | 10/2007 | Seki |
| 2004/0254729 | A1 | | 12/2004 | Browne et al. |

FOREIGN PATENT DOCUMENTS

JP 2005-291030 * 10/2005
* cited by examiner

*Primary Examiner* — Michael J. Zanelli
(74) *Attorney, Agent, or Firm* — Ingrassia Fisher & Lorenz P.C.

(57) ABSTRACT

A method is provided for detecting a likely pedal misapplication event and mitigating the effects of a pedal misapplication. In one embodiment the method comprises determining if likely pedal misapplication has occurred by the steps of: determining if a gear shift has occurred within a threshold time; determining if a vehicle velocity is below a threshold velocity; determining if the accelerator pedal is above a threshold application level; determining if the brake pedal is being applied by the driver; and determining if an obstacle is in the vehicle path and within a threshold distance. If these criteria are found, a likely pedal misapplication is detected.

18 Claims, 2 Drawing Sheets the present invention will hereinafter be described in conjunction with the following drawing figures, wherein like numerals denote like elements, and

AUTONOMOUS CONTROL FOR VEHICLE PEDAL MIS-APPLY SITUATIONS

TECHNICAL FIELD

The present invention relates generally to vehicular systems and, more particularly, to a method and system for mitigating pedal misapplication in a vehicle.

BACKGROUND OF THE INVENTION

The driver may inadvertently apply the accelerator pedal while intending to apply the brake pedal. This "pedal confusion" and the resulting misapplication of the pedal can result in significant negative events, compromising both the safety of the driver and others.

This problem can be further exacerbated by the driver continuing to believe that they are applying the correct pedal. For example, the driver may continue to believe that they are applying the brakes when they are in fact, continuing to apply the accelerator. This can cause panic by the driver, with the result sometimes being that the driver will fully apply the wrong pedal. Such an action can culminate in a significant accident, with considerable loss of property, and significant probability of injury.

Accordingly, it is desirable to provide a method and apparatus detecting likely pedal misapplication events, and to provide a method and apparatus for mitigating the possible effects of such a pedal misapplication. Furthermore, other desirable features and functions of the present invention will become apparent from the subsequent detailed description of the invention and the appended claims, taken in conjunction with the accompanying drawings and this background of the invention.

SUMMARY OF THE INVENTION

A method is provided for detecting a likely pedal misapplication event and mitigating the effects of a pedal misapplication. In one embodiment, and by way of example only, the method comprises determining if likely pedal misapplication has occurred by the steps of: determining if a gear shift has occurred within a threshold time; determining if a vehicle velocity is below a threshold velocity; determining if the accelerator pedal is above a threshold application level; determining if the brake pedal is below a threshold application level; and determining if an obstacle is in the vehicle path and within a threshold distance. If these criteria are found, a likely pedal misapplication is detected. When such a likely pedal misapplication is detected, the method can additionally comprise the performing of a wrong pedal mitigation process. The wrong pedal mitigation can include the engagement of autonomous braking, the ignoring of accelerator based commands, and audible alerts to users.

An apparatus is provided for detecting likely pedal misapplication and mitigating the effects of the pedal misapplication. In one embodiment, and by way of example only, the apparatus comprises a gear shift detector, a velocity detector, an accelerator pedal detector, a brake pedal detector, an obstacle detector, and a processor. The gear shift detector is configured to facilitate the determination of whether a gear shift has occurred within a threshold time. The velocity detector is configured to facilitate the determination of whether the vehicle's velocity is below a threshold velocity. The accelerator pedal detector is configured to facilitate the determination of whether the accelerator pedal is being applied above a threshold application level. The brake pedal detector is configured to facilitate the determination of whether the brake pedal is being applied below a threshold application level. The obstacle detector is configured to facilitate the determination of whether an obstacle is in the vehicle path and within a threshold distance. These detectors are coupled to the processor, which is configured to detect likely pedal misapplications.

In addition, the apparatus can comprise a wrong pedal mitigation system that is configured to reduce the likely negative impacts of a pedal misapplication. The wrong pedal mitigation system can be configured to engage autonomous braking and disengage accelerator based commands in response to a detected likely pedal misapplication.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
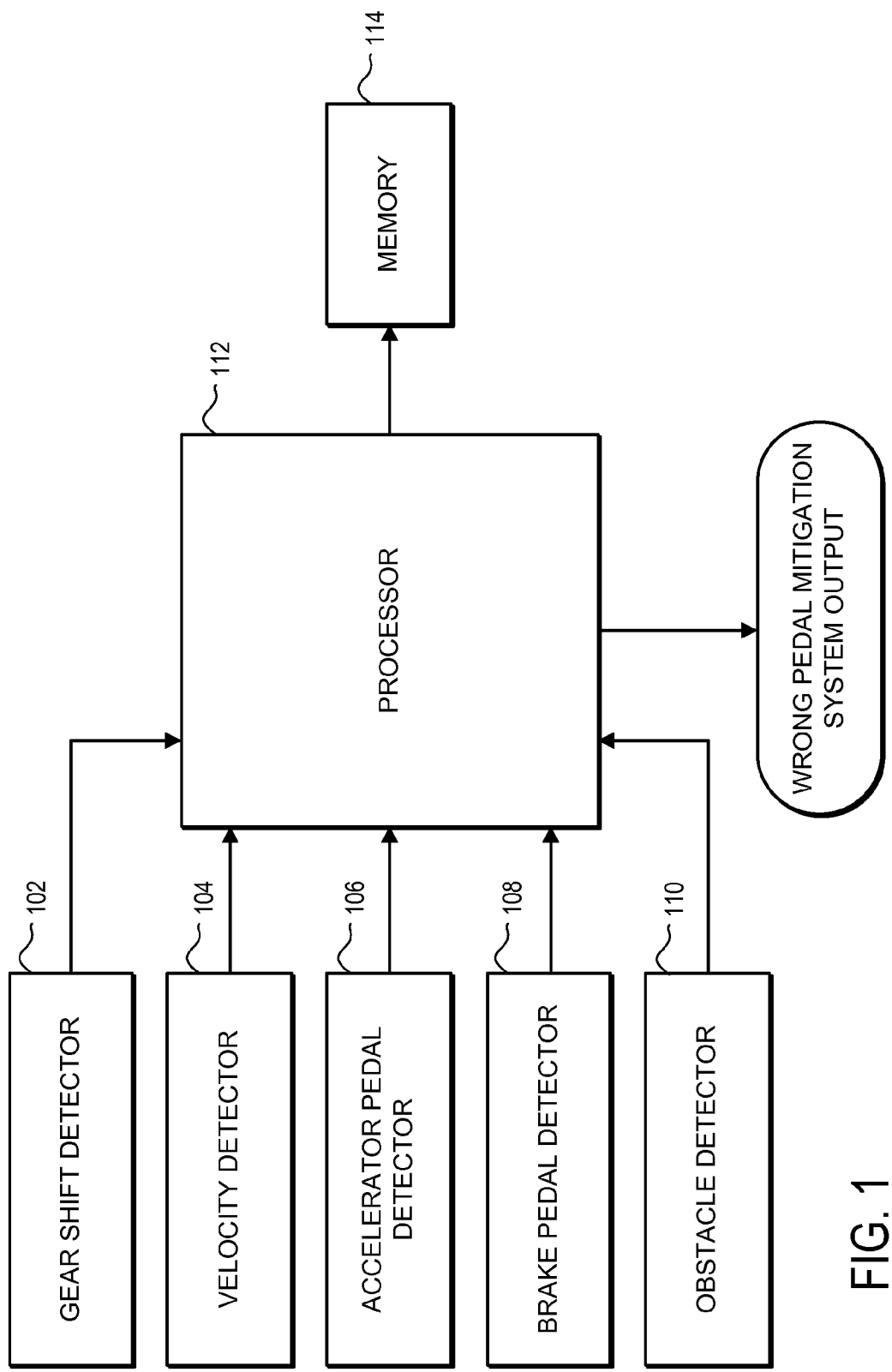
FIG. 1 is a functional block diagram of a wrong pedal mitigation system in accordance with an embodiment.

FIG. 1 is a functional block diagram of a pedal misapplication detection system 100. In general, the pedal misapplication detection system 100 monitors sensor data from various systems and devices, and determines when a likely pedal misapplication has occurred. For example, when a driver has intended to apply the brakes, but has instead applied the accelerator, and thus is inadvertently causing vehicle motion. In such situations, the driver may continue to believe that they are applying the brakes, and thus may continue to inadvertently apply the accelerator. This can continue, with the result sometimes being that the driver is fully applying the accelerator. The result of such a driver error can be a significant accident, with considerable loss of property and significant probability of injury.

To determine when a pedal misapplication might be occurring, the pedal misapplication detection system 100 includes a gear shift detector 102, a velocity detector 104, an accelerator pedal detector 106, a brake pedal detector 108, an obstacle detector 110, and a processor 112. Each of the various detectors is coupled to, and configured to provide data from its associated system to the processor 112. The system may also include a separate memory 114 to store the programs and values used to implement the system.

Preferably, the pedal misapplication detection system 100 is configured to be implemented as part of, or in conjunction with, the vehicle control system. As such, the various elements of the pedal misapplication detection system 100 may serve as various control and monitoring devices for the vehicle. For example, the obstacle detector 110 can be implemented in connection with a larger obstacle detection and avoidance (ODA) system.

The gear shift detector 102 is coupled to a gear shifter, and is configured to periodically detect values of gear shift position and transmit those values to the processor 112. Likewise, the velocity detector 104 is coupled to the vehicle speed sensors, and is configured to detect vehicle velocity and transmit those values to the processor 112. The accelerator pedal detector 106 is coupled to an accelerator pedal module, and is configured to periodically detect values of accelerator pedal position and transmit those values to the processor 112. The brake pedal detector 108 is coupled to a brake pedal module, and is configured to periodically detect values of brake pedal position and transmit those values to the processor 112.

It should be appreciated that each of these various elements functions with the pedal misapplication detection system 100, that these elements may be implemented in connection with and/or as part of other systems and/or other apparatus in the vehicle.

The processor 112 receives data from the various detectors and determines if a likely pedal misapplication is occurring. To facilitate this, the processor can perform a variety of calculations and comparisons. For example, it can perform calculations such as subtracting pedal position values from minimum values, comparing those values to various threshold values, calculating various time measurements, such as the amount of time that has elapsed since a gear shift has occurred, among various other types of determinations, comparisons, and/or calculations. The processor 112 can also be configured to provide wrong pedal mitigation, such as by engaging autonomous braking, if one or more conditions apply, based on these determinations, comparisons, and/or calculations.

The memory 114 is coupled to the processor 112. The memory 114 is configured for storing various values, such as the various threshold values used by the system 100 in connection with the process 200 discussed below, during or between various iterations of the process 200.

The processor 112 is configured to detect likely pedal misapplication and mitigate the effects of the pedal misapplication. In one embodiment, processor 112 is configured to determine if a gear shift has occurred within a threshold time based on data from the gear shift detector 102. Likewise, the processor 112 is configured to determine if the vehicle's velocity is below a threshold velocity based on data from the velocity detector 104. Likewise, the processor 112 is configured to determine if the accelerator pedal is being applied above a threshold application level based on data from the accelerator pedal detector 106. Likewise, the processor 112 is configured to determine if the brake pedal is being applied below a threshold application level based on data from the brake pedal detector 108. Finally, the processor 112 is configured to determine if an obstacle is in the vehicle path and within a threshold distance based on data from the obstacle detector 110. In addition, the processor 112 can be configured to engage autonomous braking and disengage accelerator based commands in response to a detected likely pedal misapplication.

Figure 2:
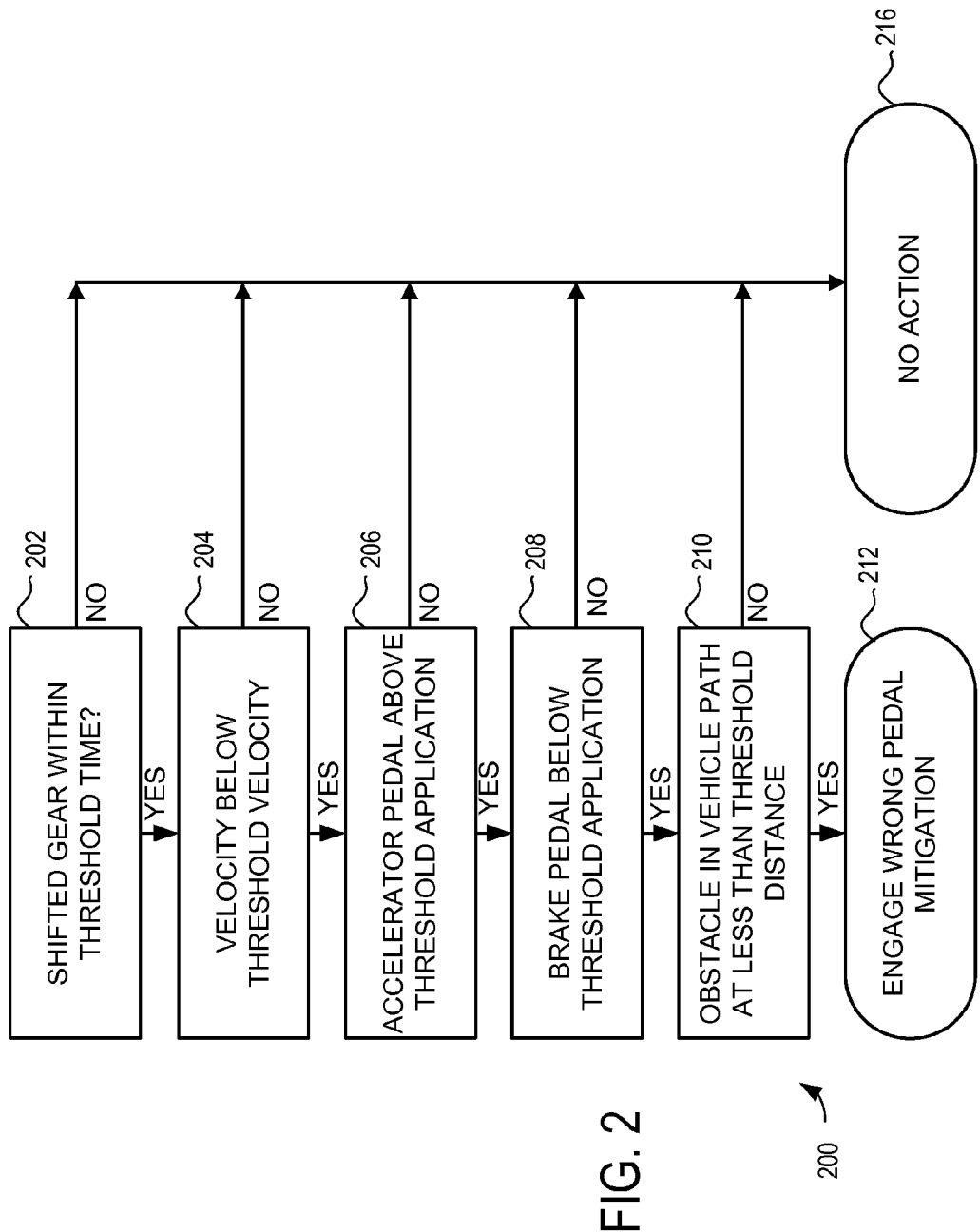
FIG. 2 is a flowchart depicting a process for wrong pedal mitigation in accordance with an embodiment.

Turning now to FIG. 2, a method 200 for selectively applying wrong pedal mitigation is illustrated. In general, the method 200 determines if a pedal misapplication has likely occurred, and engages mitigation when such a determination is made. The method 200 is specific to misapplication of the accelerator pedal when the intended application was to the brake pedal, although this is just one example implementation.

The first step 202 is to determine if the driver has recently shifted the vehicle gear, e.g., within a threshold time period. It is typical for serious wrong pedal applications to occur shortly after a gear switch. This is typically because the confusion resulting from a wrong pedal application is typically exacerbated when the driver makes an additional mistake in gearing. For example, when a driver switches gears, and accidentally moves into a forward gear when intending to go into reverse and vice versa. When such a mistaken gear switch is followed by a pedal misapplication, the potential for serious accident is significantly compounded. Thus, step 202 determines if a gear shift has occurred within the recent past. If no gear shift has occurred, the method proceeds to step 216 and no action is taken. If the gear shift has occurred within the threshold time period, the method proceeds to step 204.

The threshold value used in this determination can be selected based on a variety of factors. The higher the threshold value, the greater the number of pedal misapply situations in which mitigation may be applied. As one example, the threshold time can be selected to be within the range of 0.3 second and 2 seconds.

The next step 204 is to determine if vehicle velocity is below a threshold velocity. This step insures that the pedal misapply mitigation is activated only at relatively low speeds where pedal misapply is likely to occur, and where the potential negative impacts the mitigation are minimized. Thus, step 204 determines if the vehicle velocity is below a threshold velocity. If the velocity is above the threshold, the method proceeds to step 216 and no action is taken. If the vehicle velocity is below the threshold, the method proceeds to step 206. As one example, the threshold velocity can be set between 3-5 MPH.

The next step 206 is to determine if the accelerator pedal is applied above a threshold application level. This step measures whether the driver is significantly pressing the accelerator pedal. In a typical pedal misapply situation, the driver strongly applies the accelerator pedal while thinking they are applying the brake pedal. When the vehicle does not respond as they expect, they may incorrectly apply the accelerator pedal more. Thus, by measuring the level at which the accelerator is applied, the method 200 can identify pedal misapplication.

Step 206 thus determines if the accelerator pedal is above a threshold application level. If the pedal application is below the threshold, the method proceeds to step 216 and no action is taken. If the pedal application is above the threshold, the method proceeds to step 208. In one embodiment, the accelerator pedal is determined as a percentage, with zero percent corresponding to the driver not depressing the accelerator pedal at all, and with one hundred percent corresponding to the driver fully depressing the accelerator pedal. In this example, the application threshold can be set between 30-80% of full pedal application. However, it will be appreciated that in various embodiments other determinations of accelerator pedal position may be utilized.

The next step 208 is to determine whether or not the brake pedal is applied by the driver. Again, in a typical pedal misapply situation, the driver strongly applies the accelerator pedal while thinking they are applying the brake pedal. Step 208 thus determines if the brake pedal is being applied. If the brake pedal is being applied by the driver, the method proceeds to step 216 and no action is taken. If the brake pedal is not being applied by the driver, the method proceeds to step 210.

The next step 210 is to determine if there is an obstacle in the vehicle path at less than a threshold distance. The obstacle could be in front the vehicle if it is drive, or behind the vehicle if is in reverse. In either event, the obstacle detector determines if there is obstacle in the vehicle path, at a distance less than a threshold level.

A wide variety of different sensors and sensing systems can be used to determine if an object is in the vehicle path. For example, the obstacle detector can be implemented in connection with a larger obstacle detection and avoidance (ODA) system. Such a system can detect objects by transmitting pulses (e.g., infrared, ultrasonic, radar, etc.) and receiving pulses reflected back from potential obstacles. Such an obstacle detector may comprise ultrasonic, radar sensors, lidar sensors, vision sensors, or any combination of obstacle sensors. In any case, the obstacle detector detects objects in the path of the vehicle, and can provide a measurement of the distance the detected object. That distance can then be compared to the threshold distance.

If there is no detected object within the threshold distance, the method proceeds to step 216 and no action is taken. If there is a detected object, the method proceeds to step 212 to engage wrong pedal mitigation.

In step 212, wrong pedal mitigation is performed. In this step, a variety of different procedures can be used to reduce and/or eliminate the potential for the wrong pedal application to result in damage.

In one embodiment, step 212 involves the engaging of an autonomous braking system. Such a system can automatically apply the brakes at calculated levels of braking. Such a system can thus prevent the vehicle from moving into an obstacle as a result of the pedal misapplication.

In another embodiment, step 212 involves idling the torque request sent to the engine. This effectively cuts off the request for more power that would otherwise result from the application of the accelerator pedal. Thus, this technique also prevents the vehicle from accelerating in response to the misapplied pedal, and can thus prevent collision with the obstacle in the vehicle path.

The system and method thus provide the ability to monitor sensor data and determine when a likely pedal misapplication has occurred. Furthermore, the system can provide for mitigation of such a detected pedal misapplication.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for determining pedal misapplication in a vehicle, the method comprising the steps of:
    determining if a first pedal is applied above a first threshold level;
    determining if a second pedal is applied below a second threshold level;
    determining if an obstacle is within a path of the vehicle and within a threshold distance; and
    determining if pedal misapplication has likely occurred based at least in part on the determining if the first pedal is applied above the first threshold level, the determining if the second pedal is applied below the second threshold level, and the determining if the obstacle is within the path of the vehicle and within the threshold distance.

2. The method of claim 1, further comprising the step of:
    determining if a gear shift occurred within a threshold period of time.

3. The method of claim 1, further comprising the step of:
    determining if a vehicle velocity is below a threshold velocity.

4. The method of claim 1, wherein the first pedal is an accelerator pedal, and wherein the second pedal is a brake pedal.

5. The method of claim 1, further comprising the step of:
    engaging wrong pedal mitigation in response to a determined pedal misapplication.

6. The method of claim 5, wherein the step of engaging wrong pedal mitigation in response to the determined pedal misapplication comprises:
    engaging autonomous braking in the vehicle.

7. The method of claim 5, wherein the step of engaging wrong pedal mitigation in response to the determined pedal misapplication comprises:
    idling a torque request to the vehicle.

8. The method of claim 1, wherein the step of determining if the obstacle is within the path of the vehicle and within the threshold distance comprises:
    using an ultrasonic sensor.

9. The method of claim 1, wherein the step of determining if the obstacle is within the path of the vehicle and within the threshold distance comprises:
    using a sensor selected from a group consisting of an ultrasonic sensor, a radar sensor, a lidar sensor and a vision sensor.

10. A method for selectively mitigating pedal misapplication in a vehicle, the method comprising the steps of:
    A) determining if pedal misapplication is occurring by:
        determining if a gear shift occurred within a threshold period of time;
        determining if a vehicle velocity is below a threshold velocity;
        determining if an accelerator pedal is applied at a level above a first threshold;
        determining if a brake pedal is being applied; and
        determining if an obstacle is within a path of the vehicle and within a threshold distance;
    B) applying wrong pedal mitigation if pedal misapplication is determined to be occurring.

11. The method of claim 10, wherein the step of applying wrong pedal mitigation if pedal misapplication is determined to be occurring comprises:
    engaging autonomous braking in the vehicle.

12. The method of claim 10, wherein the step of applying wrong pedal mitigation if pedal misapplication is determined to be occurring comprises:
    idling a torque request to the vehicle.

13. The method of claim 10, wherein the step of determining if the obstacle is within the path of the vehicle and within the threshold distance comprises:
    using an ultrasonic sensor.

14. A system for selectively mitigating pedal misapplication in a vehicle, the system comprising:
    an accelerator pedal detector configured to detect a position of an accelerator pedal;
    a brake pedal detector configured to detect a position of a brake pedal;
    an obstacle detector configured to detect objects in a vehicle path; and
    a processor coupled to the accelerator pedal detector, the brake pedal detector, and the obstacle detector, the processor configured to:
        A) determine if pedal misapplication is occurring by:
            determining if the position of the accelerator pedal is above a first threshold;

determining if the position of the brake pedal is below a second threshold; and determining if an obstacle is within a path of the vehicle and within a threshold distance; and B) apply wrong pedal mitigation if pedal misapplication is determined to be occurring.

15. The system of claim 14, wherein the system further comprises a gear shift detector coupled to the processor, and wherein the processor is further configured to determine if pedal misapplication is occurring by:

determining if a gear shift occurred within a threshold period of time.

16. The system of claim 14, wherein the system further comprises a velocity detector coupled to the processor, and wherein the processor is further configured to determine if pedal misapplication is occurring by:

determining if a vehicle velocity is below a threshold velocity.

17. The system of claim 14, wherein the processor is configured to apply wrong pedal mitigation if pedal misapplication is determined to be occurring by:

engaging autonomous braking in the vehicle.

18. The system of claim 14, wherein the processor is configured to apply wrong pedal mitigation if pedal misapplication is determined to be occurring by:

idling a torque request to the vehicle.

* * * * *